United States Patent [19]

Suzuki et al.

[11] Patent Number: 4,506,037

[45] Date of Patent: Mar. 19, 1985

[54] PRODUCTION OF RESIN FOAM BY AQUEOUS MEDIUM

[75] Inventors: Shigemasa Suzuki, Koshigaya; Toshiyuki Takai, Kounosu, both of Japan

[73] Assignee: Chuo. Kagaku Co., Ltd., Japan

[21] Appl. No.: 590,914

[22] Filed: Mar. 15, 1984

[30] Foreign Application Priority Data

Mar. 23, 1983 [JP] Japan ................................ 58-47028
May 20, 1983 [JP] Japan ................................ 58-87534

[51] Int. Cl.$^3$ .............................................. C08J 9/22
[52] U.S. Cl. ...................................... 521/82; 427/180; 427/184; 427/222; 427/374.4; 427/395; 521/65; 521/70; 521/72; 521/76; 521/84.1; 521/88; 521/91; 521/92; 521/93; 521/95; 521/97; 521/134; 521/136; 521/139; 521/140; 524/13; 524/14; 524/425; 524/426; 524/427; 524/451; 528/480; 528/482; 528/485; 528/489; 528/490; 528/491; 528/492
[58] Field of Search ................. 524/13, 14, 425, 426, 524/427, 451; 528/480, 482, 485, 489, 490, 491, 492; 427/180, 184, 222, 374.4, 395.5; 521/82, 65, 70, 72, 76, 84.1, 88, 91, 92, 93, 95, 97, 134, 136, 139, 140

[56] References Cited

U.S. PATENT DOCUMENTS 3,546,143 12/1970 Corbett ............................... 260/2.5
3,627,709 12/1971 Hansen ............................ 260/2.5 R
3,627,709 12/1971 Hansen ............................ 260/2.5 R
3,997,494 12/1976 Lever ............................... 260/42.42
4,238,570 12/1980 Shibata et al. ....................... 521/58

FOREIGN PATENT DOCUMENTS 2284633 4/1976 France .

*Primary Examiner*—Maurice J. Welsh
*Attorney, Agent, or Firm*—Wenderoth, Lind & Ponack

[57] ABSTRACT

A process for producing a resin foam by using an aqueous medium, which comprises
(a) treating a resin compound with said aqueous medium to cause the aqueous medium to adhere to and be held by the resin compound, said resin compound being composed of porous agglomerated particles resulting from partial melt-adhesion of thermoplastic resin particles coated with a fine hydrophilic solid powder which does not substantially melt at the melting temperature of the resin particles, said solid powder being embedded in the resin particles but partly exposed at their surfaces,
(b) melt-kneading the resin compound treated with the aqueous medium under such an elevated pressure that evaporation of the aqueous medium is substantially inhibited, and
(c) thereafter releasing the kneaded resin composition from the pressurized state to foam it; and a thermoplastic resin compound used for the aforesaid process.

33 Claims, No Drawings

PRODUCTION OF RESIN FOAM BY AQUEOUS MEDIUM

This invention relates to an improvement in a technique of foaming thermoplastic resins. More specifically, it relates to a process for producing a thermoplastic resin foam by using an aqueous medium as a blowing agent, a thermoplastic resin compound suitable for use in the above process, and to a process for producing the thermoplastic resin compound.

For the production of thermoplastic resin foams, a method has previously been employed which comprises melt-kneading under pressure a thermoplastic resin and a heat-decomposable blowing agent capable of generating nitrogen gas or carbon dioxide gas upon decomposition by heat, a low-boiling liquid or a liquefied gas, and thereafter lowering the pressure. When the heat-decomposable blowing agent is used, its decomposition residue colors the resulting resin foam or makes it malodorous, and foaming is difficult to control. The low-boiling liquid or liquefied gas, on the other hand, gives rise to a handling problem because it involves dangers of inflammation and explosion or causes a hygienic trouble in the foaming process or during storing of foamable beads or foamed articles.

The present inventors have conducted extensive work on a process for producing thermoplastic resin foams which is free from the aforesaid defects of the prior art, and consequently found that a thermoplastic resin can be easily foamed by using an aqueous medium as a blowing agent if there is used a resin compound composed of porous agglomerated particles resulting from partial melt-adhesion of thermoplastic resin particles coated with a fine hydrophilic solid powder.

Thus, according to this invention, there is provided a process for producing a resin foam by using an aqueous medium, which comprises (a) treating a resin compound with said aqueous medium to cause the aqueous medium to adhere to and be held by the resin compound, said resin compound being composed of porous agglomerated particles resulting from partial melt-adhesion of thermoplastic resin particles coated with a fine hydrophilic solid powder which does not substantially melt at the melt temperature of the resin particles, said solid powder being embedded in the resin particles but partly exposed at their surfaces, (b) melt-kneading the resin compound treated with the aqueous medium under such an elevated pressure that evaporation of the aqueous medium is substantially inhibited, and (c) thereafter releasing the kneaded resin composition from the pressurized state to foam it.

Since water is a liquid having a relatively low boiling point, it can theoretically become a blowing agent for thermoplastic resins. Water, however, has poor compatibility with resins which are generally hydrophobic, and, for example, it is the practice to use fillers for resins after water has been removed therefrom by drying. The use of water as a blowing agent for resins has never been thought of in the past. Unexpectedly, the use of water as a blowing agent for thermoplastic resins has become possible for the first time by this invention, and thus, the present invention provides an innovative technique.

Since an aqueous medium having a high latent heat of evaporation is used as a blowing agent, foamed cellular walls are rapidly cooled at the time of foaming by the gasification of the aqueous medium, and their strength is markedly increased. According to the process of this invention, therefore, melt extrusion at a relatively high temperature and a high speed can be carried out unlike foaming by the aforesaid heat-decomposable blowing agent which involves both an exothermic or endothermic reaction, and a resin foam of high quality can be produced with high productivity. Furthermore, the process of this invention leaves no decomposition residue which colors the resin or makes it malodorous as in the case of using heat-decomposable blowing agents. The aqueous medium used in this invention has no risk of inflammation and explosion and causes no hygienic trouble. It is a clean blowing agent which can be handled easily. The process of this invention is therefore very advantageous industrially for the production of thermoplastic resin foams.

The process of this invention will be described below in greater detail.

There is no particular restriction on the thermoplastic resin used in this invention, and any thermoplastic resins which have heretofore been used for plastic molding processes can be used. Examples include olefinic resins such as high-density polyethylene, low-density polyethylene, polypropylene, polybutene, ethylene-vinyl acetate copolymer, ethylene-propylene copolymer, and petroleum resins; diene resins such as polybutadiene and polyisoprene; vinyl resins such as polyvinyl chloride, polyvinyl acetate, polyvinylidene chloride and polyvinyl alcohol; acrylic resins such as poly(methyl methacrylate); styrene resins such as polystyrene, acrylonitrile-styrene copolymer and acrylonitrile-butadiene-styrene copolymer; polyamide resins such as nylon-6, nylon-66 and nylon-12; and polyester resins such as polyethylene terephthalate. These resin may be used singly or in combination. The process of this invention can be applied also to a blend of at least two thermoplastic resins having poor compatibility with each other, for example a blend of polypropylene and polystyrene because it can give a uniform blend even from such a resin combination.

The present invention is applied preferably to olefinic resins such as polyethylene and polypropylene, and styrene resins such as polystyrene, acrylonitrile-styrene copolymer or acrylonitrile-butadiene-styrene copolymer.

The fine hydrophilic solid powder to be used in combination with the above resin is any organic or inorganic substance which is itself hydrophilic or to which hydrophilicity has been imparted by a hydrophilizing treatment.

The fine hydrophilic solid powder used in this invention does not substantially melt at the melting temperature of the resin particles to be used in combination, and desirably is not easily soluble in the aqueous medium although it may be swollen by the aqueous medium. Advantageously, the fine hydrophilic solid powder has a solubility in water of generally not more than 10 g/liter, preferably not more than 5 g/liter at 25° C.

Examples of the fine hydrophilic solid powder which can be conveniently used in this invention include cereal powders such as starch and wheat flour; plant powders such as wood flour; powders of hydrophilic resins such as urea resins, melamine resins and phenolic resins; powders of metals such as iron and aluminum; and powders of inorganic materials such as talc, clay, calcium carbonate, silica, alumina and glass. These fine solid powders have sufficient hydrophilicity by themselves, but their hydrophilicity and affinity for the resin may further be increased by treating their surface with a substance which improves wettability with water (to be referred to as a surface activator). Examples of the surface activator are nonionic surface-active agents such as fatty acid alkanol amides, fatty acid monoglycerides and polyethylene glycol fatty acid esters; anionic surface active agents such as fatty acid amides, fatty acid metal salts, alkyl sulfates and alkyl phosphates; cationic surface-active agents such as ammonium salts; polyhydric alcohols such as polyethylene glycol, polypropylene glycol and glycerol; ethers such as polyethylene glycol diethyl ether; and polyvinyl alcohol.

Hydrophobic substances may also be used if they are surface-treated with the above-exemplified surface active agents, polyvinyl alcohol, fatty acids, polyhydric alcohols, ethers, etc. to impart hydrophilicity.

The above fine hydrophilic solid powders may be used singly or as a mixture of two or more. In the present invention, talc, calcium carbonate, clay, silica and alumina, particularly those having an average particle diameter of 1 to 15 microns, are preferably used.

A part of the fine hydrophilic solid powder, generally up to 20% by weight, preferably up to 10% by weight, of the total amount of the fine solid powder, may be replaced by organic short fibers such as pulp, cotton, silk, flax, wool, synthetic fibers and regenerated fibers, or inorganic short fibers such as glass fibers, carbon fibers and asbestos. The use of these short fibers can greatly increase the mechanical strength of the resulting foam.

The particle size of the fine hydrophilic solid powder used in this invention is not strictly limited, and may be varied widely according to the desired degree of foaming, the type of the resin, the properties required of the final foam, etc. Generally, the suitable average particle diameter of the fine hydrophilic solid powder is not more than 100 microns, preferably 0.1 to 50 microns, more preferably 0.5 to 30 microns. The short fibers which may be used together have a length of generally not more than 10 mm, preferably not more than 5 mm, and a diameter of generally not more than 100 microns, preferably 1 to 50 microns.

In preparing thermoplastic resin particles coated with the fine hydrophilic solid powder, it is important that the fine solid powder should be adhered to and embedded in the resin particles while being partly exposed at their surface (of course, the resin powder may further contain the fine solid powder dispersed therein). The amount of the fine solid powder to be adhered and embedded is desirably such that most of the surface of the resin particles is covered with the exposed fine solid powder, and when it is observed by an electron microscope with 300 magnifications, the substrate of the resin particles can scarcely be ascertained.

It is furthermore important that many of the resin particles coated with the exposed fine hydrophilic solid powder gather and partly melt-adhere to each other to form porous agglomerated particles. When treated with the aqueous medium, such porous agglomerted particles should hold the aqueous medium stably. Accordingly, it is very desirable that the porous agglomerated particles should have a water vapor adsorption ratio of at least 0.05%, preferably at least 0.3%, more preferably at least 0.5%. The "water vapor adsorption ratio" is determined as follows: $W_1$ g of a sample of porous agglomerted particles which had been maintained for 24 hours in a constant temperature and humidity chamber at a temperature of 25° C., a relative humidity of 30% and a pressure of 1 atm, were maintained for 1 hour in a closed atmosphere at a temperature of 105° C. and a water vapor pressure of 1.2 atms. The sample was then withdrawn and left on filter paper for 3 minutes, and placed in a drying oven at 105° C. for 3 minutes. The weight of the sample was immediately measured ($W_2$ g). The water vapor adsorption ratio is calculated from the following equation.

$$\text{Water vapor adsorption ratio (\%)} = \frac{W_2 - W_1}{W_1} \times 100$$

The size of the porous agglomerated particles is not important and may be any desired one. But from the standpoint of the ease of handling and melt-kneading, the suitable size of the porous agglomerated particles is 0.1 to 20 mm, preferably 0.3 to 5 mm, in diameter. Larger particles are preferably reduced to the above size by a pulverizer, a mixer, etc.

One advantageous method of preparing such porous agglomerated particles is to mix the thermoplastic resin particles and the fine hydrophilic solid powder at a high speed at a temperature above the melting temperature of the thermoplasic resin in a high speed (vortical flow) mixer such as a Henschel mixer (manufactured by Mitsui Miike Seisakusho) and a supermixer (manufactured by Kawada Seisakusho). The resin is heated by circulating steam or an oil through a jacket of the mixer, or by the heat generated by mixing and friction.

When the resin reaches the melting temperature and begins to melt in the aforesaid mixing under heat at high speeds, its resistance to the mixing rotating force of the mixer abruptly increases, and the rotating resistance (or the current) of the motor of the mixer fluctuates violently. Conveniently, the high-speed mixing under the violent fluctuations is continued generally for about 50 to about 250 seconds, preferably about 70 to about 200 seconds, from the time when the rotating resistance (or the current) of the motor begins to increase under violent fluctuations.

When only the resin is mixed under heat in the high-speed mixer at a temperature above the melting temperature of the resin, the resin melt-adheres to itself and becomes a soft sticky paste. In the present invention, the resin is deformed while the melt-adhesion of the resin is prevented by the adhesion of the fine solid powder to the surface of the resin. This change in shape will be described more specifically below.

(1) Until the melting and deformation of the resin begin and the current of the motor begins to increase under violent fluctuations, the resin does not melt-adhere to itself irrespective of whether it is fed in the form of pellets or a powder. During this period, the resin and the fine solid powder are simply mixed and dispersed.

(2) Gradually, the resin is melted and deformed into the shape of flattened thin flakes which are successively pulled off and become thin flaky particles. Simultaneously, the fine solid particles adhere to the surface of the resin particles and partly embedded therein. Thus, the surface of the thin flaky particles of the resin is covered with the fine solid powder.

(3) The adhesion of the fine solid powder to the resin surface further proceeds, and the resin particles covered with the fine solid powder partly melt-adhere to each other by the molten resin exuding from among the fine solid particles covering the resin surface and/or through the free fine pieces of the resin and/or at the fine exposed surfaces of the resin to which the fine solid powder does not adhere. As a result, porous agglomerated particles are formed.

(4) At this time, the porous agglomerated particles are cooled and solidified by releasing them out of the mixing tank, and allowing them to stand or spraying water and/or blowing air onto them, and as required, rotating them at a low speed. They may also be cooled and solidified within the mixing tank if cooling water is passed through a jacket of the mixing tank and air is blown against them. As a result, a resin compound composed of the porous agglomerated particles can be obtained.

The mixing device used in this invention is not limited to a high-speed mixer, and may be any mixer which has the same function as described above. Among mixing devices now easily available, the high-speed mixer is used most frequently because it can be directly used without modification. Other mixers such as a ribbon blender may likewise be used if they are remodelled to impart high rotating power.

The proportion of the fine hydrophilic solid powder based on the thermoplastic resin at the time of charging them into the mixer can be varied widely according to the types of the resin and the fine solid powder, the water absorption and the water vapor adsorption ratio required of the resulting porous agglomerated particles, etc. Generally, the proportion of the fine solid powder is 30 to 250 parts by weight, preferably 60 to 150 parts by weight, more preferably 80 to 120 parts by weight, per 100 pars by weight of the thermoplastic resin. When a part of the fine solid powder is replaced by the fibrous material described above, the suitable proportion of the fibrous material is not more than 20% by weight, preferably not more than 10% by weight, based on the entire fine solid powder.

In preparing the porous agglomerated particles, additives such as antioxidants, surface-active agents, coloring agents, ultraviolet absorbers and fire retardants may also be charged as required. Examples of the antioxidants which may be used in this invention include thiopropionate-type antioxidants such as dilauryl thiodipropionate, phenolic antioxidants such as alkylphenols and alkylbisphenols, and mixtures of these two types of antioxidants. Examples of the surface-active agents are those given hereinabove. The antioxidants are used normally in a proportion of 0.01 to 5 parts by weight per 100 parts by weight of the fine solid powder. The surface-active agents may be used in a proportion of generally 0.1 to 10 parts by weight per 100 parts by weight of the fine solid powder. Examples of the coloring agents are dyes and pigments, such as Cadmium Red, Chrome Orange, Chrome Yellow, Chrome Green, Cobalt Aluminate Blue, titania, Phthalocyanine Blue and azoic dyes. The ultraviolet absorbers may, for example, be those of the salicyclic acid type, benzophenone type and bezotriazole type. The fire retardants may, for example, be phosphate esters, halogenated hydrocarbons and antimony oxide. These other additives may be used in amounts which are usually employed in the art.

The porous agglomerated particles so prepared are directly used as a resin compound, and can be melt-molded into sheets and irregularly shaped articles by extrusion through an extruder, or into sheets by a calender roll via a warming roll (extrusion). Or they may be injection-molded by an in-line screw type injection molding machine. As a result, a highly filled resin article in which the fine solid powder is uniformly dispersed in the resin can be produced relatively easily. The use of the resin compound in accordance with this invention does not require a strong kneading and mixing device such as a mixing roll, an intensive mixer (Banbury mixer) or a strong two-arm kneader, nor a pelletizer. By using only a high-speed mixer, a resin compound can be obtained which can be directly fed into a melt-molding machine. The process of producing the highly filled resin article can be greatly simplified, and a resin article in which the fine solid powder is dipsersed uniformly in a larger amount can be easily produced.

The resin compound prepared as described above, however, is especially advantageously used for producing a resin foam by treating it with an aqueous medium as a blowing agent, melt-kneading it under such an elevated pressure that evaporation of the aqueous medium is substantially inhibited, and thereafter releasing the melt-kneaded resin composition from the elevated pressure to foam it.

Water is generally used as a aqueous medium, but a surface active agent, a water-soluble polymer, a polyhydric alcohol, a water-miscible organic sovlent, etc. may be added as required in order to adjust the boiling point or vapor pressure of the medium, increase the affinity of the aqueous medium for the porous agglomerated particles, improve the dispersion stability of the aqueous medium during the melt-kneading of the resin compound, or to increase the uniformity of the cells of the resulting foam. The same surface-active agents as exemplified hereinabove may be used in a concentration of 0.1 to 50 g, preferably 1 to 10 g, per liter of water. Examples of the water-soluble polymer and polyhydric alcohol include polyvinyl alcohol having a degree of polymerization of about 500 to about 2,000 and a degree of saponification of at least 85%, and mono- or polyethylene glycols having a number average molecular weight of up to 400 and glycerol. These compounds may be added in a concentration of generally 1 to 100 g, preferably 10 to 50 g, per liter of water. Examples of water-miscible organic solvents which may be used in this invention include alcohols such as methanol, ethanol, propanol and cyclohexanol, esters such as ethyl acetate and butyl acetate, ethers such as diethyl ether, dioxane and trioxane, and ketones such as acetone and methyl ethyl ketone. The organic solvents may be added in a concentration of generally 1 to 100 g, preferably 10 to 50 g, per liter of water.

The amount of the aqueous medium can be varied widely depending upon the expansion ratio desired of the foam. Generally, it may be 1 to 15 parts by weight, preferably 1.5 to 10 parts by weight, more preferably 2 to 5 parts by weight, per 100 parts by weight of the porous agglomerated particles. The resin compound can be treated with the aqueous medium by mixing them together in a mixer.

The resin compound treated with the aqueous medium as described above is then melt-kneaded under such an elevated pressure that evaporation of the aqueous medium is substantially inhibited. This melt-kneading can be carried out in the same way as the melt-kneading carried out in the production of ordinary resin foams, for example by using a nonvent-type single or multiple screw extruder or an injection molding machine.

The expression "such an elevated pressure that evaporation of the aqueous medium is substantially inhibited", as used herein, denotes a pressure which is higher than the vapor pressure, at the melt-kneading temperature, of the aqueous medium impregnated in the resin compound. The operation of the extruder or the injection molding machine is not special, and may be carried out in a manner known per se.

The fully melt-kneaded resin composition is foamed and solidified by extruding it in the molten state through a die lip of various configurations, injecting it into a suitable mold, or molding it in a press-molding machine, and releasing it from the pressurized state. As a result, there can be obtained resin foams of various shapes, such as a corrugated foamed sheet, a flat foamed sheet, a stretched foamed sheet, irregularly shaped foamed articles, foamed blow-molded articles, and foamed pipes.

The process of this invention for producing the resin foam has the following various excellent advantages over the conventional process for producing resin foams.

(a) It has previously been considered technically difficult to foam polyolefinic resins such as polyethylene and polypropylene industrially at a high expansion ratio. By the present invention, even a non-crosslinked polyolefinic resin can be converted easily into a foam having a uniform fine closed cellular structure at a high expansion ratio.

(b) Heretofore, it has been virtually impossible to produce a resin foam containing a large amount of a filler. The process of this invention can easily give a resin foam containing a large amount of a filler on an industrial scale.

(c) Since the process of this invention enables a thermoplastic resin to be melt-extruded at a higher temperature and speed than in the prior art, a resin foam of high quality can be produced with high productivity.

(d) Since an aqueous medium having a high latent heat of evaporation is used as a blowing agent in the process of this invention, the strength of the cellular wall becomes very high, and fine uniform closed cells can be formed.

(e) Unlike conventional heat-decomposable blowing agents, the aqueous medium used in this invention does not form a decomposition residue, nor does it color the resin or make it malodorous. Furthermore, the aqueous medium used in the invention does not involve dangers of inflammation and explosion or cause a hygienic trouble as the conventional low-boiling liquids or liquefied gases.

(f) The foaming operation is not troublesome, and the apparatuses used are simple. Resin foams can therefore be produced at a low cost.

(g) The foaming can be controlled easily, and resin foams can be produced at an expansion ratio ranging from a low to a high value (from about 2 to about 30 as the volume ratio).

(h) The process of this invention can easily give a resin foam having a skin layer.

The process of this invention is illustated more specifically by the following Examples.

EXAMPLE 1

| | Amount (g) |
|---|---|
| Resin: | |
| polypropylene (Noblen MA-8A manufactured by Mitsubishi Petrochemical Co., Ltd.; MI = 0.7, density = 0.9) | 10,000 |
| Fine powder: | |
| talc (MS manufactured by Nippon Talc Co., Ltd.; average particle diameter 9 microns) | 10,000 |
| Surface activators: | |
| Fatty acid alkanol amide (Amisol LDE manufactured by Kawaken Fine Chemicals Co., Ltd.) | 100 |
| Fatty acid monoglyceride (Rikemal S-100 manufactured by Riken Vitamin Co., Ltd.) | 50 |
| Fatty acid amide (Alflow P-10 manufactured by Nippon Yushi Co., Ltd.) | 50 |
| Coloring agent: | |
| titanium oxide (anatase type, A100 manufactured by Ishihara Sangyo Co., Ltd.) | 500 |
| Antioxidant: | |
| Dilauryl thiodipropionate | 30 |
| 1,1,3-tris(2-methyl-4-hydroxy-5-t-butylphenyl)butane | 10 |

A high-speed mixer (Supermixer SMG 100 manufactured by Kawada Seisakusho; mixing motor 22KW 4P/8P) was used, and a mixing tank (capacity 100 liters) was heated by circulating a heated oil kept at 140° to 150° C. through a jacket of the tank. The above ingredients were put in the mixing tank of the mixer, and mixed at a high speed.

After the lapse of about 20 minutes, the current of the mixing motor fluctuated violently, and began to increase (the temperature of the mixture 195° C.). After the lapse of 80 seconds, the current increased rapidly, and reached 80 A (the temperature of the mixture 210° C.) in 40 seconds (120 seconds in total). Therefore, the discharge port of the mixer was opened, and the mixture was released.

The released mixture was rapidly cooled and coarsely pulverized by a mixer rotating at a low speed while blowing strong air for cooling. As a result, there was obtained resin compound having a water vapor adsorption ratio of 0.11% and composed of porous agglomerated particles resulting from partial melt-adhesion of the resin particles coated with the fine solid powder.

The resin compound was then pulverized to a maximum particle diameter of not more than 5 mm by a pulverizer (Model TC-3 3HP manufactured by Morita Seisakusho), and transferred to a mixer rotating at 50 to 300 rpm. As an aqueous medium, 500 cc (about 2.5 parts by weight per 100 parts by weight of the resin compound) of tap water containing 1% of an alkylbenzenesulfonate (Nissan NEWREX H manufactured by Nihon Yushi Co., Ltd.) was added the mixed for more than 5 minutes to prepare a resin compound impregnated with the aqueous medium.

A circular die was secured to a 70 mm extruder and an air ring was provided in the inside and outside of the die lip portion to cool the tip of the die lip and the extruded sheet. The blow ratio of the circular die to the mandrel was adjusted to 1.8. The mandrel was cooled by circulating cooling warm water and the periphery was cooled by the air ring. The resin compound impregnated with the aqueous medium was foamed and extruded by using the above device while maintaining the maximum temperature of the extruder cylinder at 225° C., the die temperature at 195° C. (the resin temperature at 198° C.), the die lip temperature at 190° C., and the warm water circulated through the mandrel at 90° C. The extrudate was taken up while stretching, and cut open. A sheet was obtained by using a take-up device and a winder.

The resin foam obtained by using the above aqueous medium had a thin skin layer on its surface and contained no broken cells. It had a closed cellular structure, and the foamed cells had a diameter of not more than 0.5 mm, and mostly in the range of 0.1 to 0.3 mm. The expansion ratio (volume ratio) was 9.8.

The foamed sheet is suitable for use as a food packaging container such as a tray molded by vacuum forming or pressure forming, and is also used as a cushioning material and a white board.

EXAMPLE 2

|  | Amount (g) |
|---|---|
| Resin: | |
| low-density polyethylene (Novatec LF 101A manufactured by Mitsubishi Chemical Co., Ltd.; MI = 0.45, density = 0.922) | 10,000 |
| Fine powder: | |
| Precipitated calcium carbonate (Whiton SSB manufactured by Shiraishi Calcium Co., Ltd.; average particle diameter 1.5 microns) | 3,000 |
| Precipitated calcium carbonate (Whiton B manufactured by Shiraishi Calcium Co., Ltd.; average particle diameter 3.6 microns) | 7,000 |
| Surface activators: | |
| Fatty acid alkanol amide (Amisol manufactured by Kawaken Fine Chemicals, Co., Ltd. CDE) | 120 |
| Polyethylene glycol (PEG 6000 manufactured by Sanyo Chemical Co., Ltd.) | 60 |
| Coloring agent: | |
| Titanium oxide (anatase type, A100 manufactured by Ishihara Sangyo Co., Ltd.) | 300 |
| Cobalt Aluminate Blude (Dainichi Seika Co., Ltd.) | 0.1 |
| Antioxidants: | |
| Dilauryl thiodipropionate | 10 |
| 2,2'-methylenebis(4-methyl-6-t-butylphenol) | 20 |
| Nonylphenyl phosphite | 10 |

The above ingredients were put into the same high-speed mixer as used in Example 1 and mixed at a high speed. After the lapse of about 16 minutes, the current of the mixing motor fluctuated violently and began to increase slightly (the temperature of the mixture 190° C.). After the lapse of 120 seconds, the current rapidly increased and reached 50 A (the temperature of the mixture 200° C.) in 5 to 10 seconds (125 to 130 seconds in total). The discharge port was therefore opened and the mixture was released.

The released mixture was rapidly cooled and coarsely pulverized by a mixer rotating at a low speed while sending strong air for cooling. Thus, there was obtained a resin compound having a water vapor adsorption ratio of 0.24% and composed of porous agglomerated particles resulting from partial melt-adhesion of the resin particles coated with the fine solid powder.

The resin compound was then pulverized to a maximum particle diameter of not more than 5 mm by a pulverizer (Model Tc-3, 3HP, maufactured by Morita Seisakusho), and transferred to a mixer rotating at 50 to 300 rpm. As an aqueous medium, 700 cc (about 3.5 parts by weight per 100 parts by weight of the resin compound) of tap water was added and mixed for 10 minutes to give a resin compound impregnated with the aqueous medium.

A T-die was secured to a 50 mm extruder, and an air knife was provided on both surfaces of the die lip portion for cooling the tip of the die lip and the extruded sheet. This device was adapted to take up the sheet while stretching. The resin compound treated with the aqueous medium was foamed and extruded by the above device while maintaining the maximum temperature of the extruder cylinder at 205° C., the temperature of the die at 170° C. (resin temperature 175° C.) and the die lip temperature at 160° C., and the extruded sheet was taken up while stretching and rapidly cooling it with the air knives. Thus, a corrugated foamed sheet was produced.

The resulting resin foam was of a closed cellular structure and had directionality as a result of stretching. The foamed cells were uniform and had a diameter of not more than 0.8 mm, and mostly about 0.5 mm. The expansion ratio (volume ratio) was 16.

The foamed sheet was suitable as a flexible cushioning material.

EXAMPLE 3

|  | Amount (g) |
|---|---|
| Resin: | |
| acrylonitrile/butadiene/styrene copolymer (JSR ABS85 manufactured by Japan Synthetic Rubber Co., Ltd.; specific gravity = 1.05, MI = 1.7) | 10,000 |
| Fine powder: | |
| Precipitated calcium carbonate (Whiton SB; average particle diameter 1.8 microns) | 8,000 |
| Wood flour (dry fine powder, particle size 100 M/S pass) | 500 |
| Surface activators: | |
| Fatty acid alkanol amide (Amisol LDE manufactured by Kawaken Fine Chemicals Co., Ltd.) | 150 |
| Fatty acid amide (AlFlow P-10 manufactured by Nihon Yushi Co., Ltd.) | 50 |
| Glycerol | 100 |
| Coloring agent: | |
| Ceramics Yellow | 100 |
| Antioxidants: | |
| Distearyl thiopropionate | 10 |
| 2,6-Di-t-butyl p-cresol | 10 |

The above ingredients were put into the same high-speed mixer as used in Example 1, and mixed at a high speed.

After the lapse of about 18 minutes, the current of the mixing motor fluctuated violently and began to increase slightly (the temperature of the mixture 220° C.). After the lapse of 160 seconds, the current rapidly increased and reached 50A (the temperature of the mixture 240° C.) in 20 to 25 seconds (180 to 185 seconds in total). The discharge port was therefore opened, and the mixture was released.

The released mixture was rapidly cooled and coarsely pulverized by a mixer rotating at a low speed while sending strong air for cooling, and there was obtained a resin compound having a water vapor adsorption ratio of 0.62% and composed of porous agglomerated particles resulting from partial melt-adhesion of the resin particles coated with the fine powder.

The resin compound was then pulverized to a maximum particle diameter of not more than 5 mm by a pulverizer (Model Tc-3, 3HP manufactured by Morita Seisakusho), and transferred to a mixer rotating at 50 to 300 rpm. As an aqueous medium, 462.5 cc (about 2.5 parts by weight per 100 parts by weight of the resin compound) of water treated with an ion exchange resin and containing 1% of polyoxyethylene fatty acid amine (Amiet 308 manufactured by Kao Soap Co., Ltd.) was added and mixed for more than 10 minutes to give a resin compound impregnated with the aqueous medium.

By a 50 mm extruder having an irregularly shaped (thick plate like) die and a cooled sizing die, and a take-up device, the resin compound impregnated with the aqueous medium was foamed and extruded while maintaining the maximum temperature of the extruder cylinder at 260° C. and the die temperature at 210° C. The sheet was taken up while circulating cooling water through the sizing die.

The resulting resin foam in the form of a thick board had a skin layer and a smooth surface and was of a closed cellular structure. The foamed cells had a diameter of not more than 0.6 mm, and the expansion ratio was 7.5.

This foamed thick plate is suitable for use as a synthetic wood material and has excellent workability.

EXAMPLE 4

|  | Amount (g) |
|---|---|
| Resin: | |
| high-impact polyethylene (DIAREX HT-516 manufactured by Mitsubishi Monsanto Co., Ltd.; MI = 2.2, density = 1.05) | 10,000 |
| Fine powder: | |
| Talc (Ms manufactured by Nippon Talc Co., Ltd.; average particle diameter 9 microns) | 3,000 |
| Starch (corn starch manufactured by Aito Co., Ltd.) | 500 |
| Surface activators: | |
| Monoethylene glycol | 50 |
| Alkylbenzenesulfonate (Nissan NEWREX H manufactured by Nihon Yushi Co., Ltd.) | 10 |
| Coloring agent: | |
| titanium oxide (anatase type, A100 manufactured by Ishihara Sangyo Co., Ltd.) | 500 |
| Antioxidants: | |
| Dilauryl thiodipropionate | 10 |
| 2,6-Di-t-butyl p-cresol | 10 |

The above ingredients except the resin were put into the same high-speed mixer as used in Example 1, and the mixer was rotated at a high speed. After the lapse of 6 minutes, the resin was introduced. After the lapse of 21 minutes from the start of the mixing operation, the current of the mixing motor violently fluctuated, and began to increase slightly (the temperature of the mixture 205° C.). After the lapse of 120 seconds, the current rapidly increased and reached 50 A (the temperature of the mixture 210° C.) in 5 to 10 seconds (125 to 130 seconds in total). The discharge port was therefore opened, and the mixture was released.

The released mixture was rapidly cooled and coarsely pulverized by a mixer rotating at a low speed while blowing strong air for cooling, and there was obtained a resin compound having a water vapor adsorption ratio of 0.76% and composed of porous agglomerated particles resulting from partial melt-adhesion of the resin particles covered with the fine powder.

The resin compound was pulverized to a maximum particle diameter of not more than 5 mm by a pulverizer (Model Tc-3, 3HP manufactured by Morita Seisakusho), and transferred to a mixer rotating at 50 to 300 rpm. As an aqueous medium, 338 cc (about 2.5 parts by weight per 100 parts by weight of the resin compound) of tap water was added and mixed for 10 minutes to give a resin compound impregnated with the aqueous medium.

Using the same sheet-forming apparatus as used in Example 1 including a 70 mm extruder, the resin compound impregnated with the aqueous medium as foamed and extruded while the maximum temperature of the extruder cylinder at 210° C., the die temperature at 190° C. (the resin temperature at 192° C.), and the die lip temperature at 180° C.

Breaking of the cells was observed on the surface of the resulting resin foam, but it had a smooth surface and showed a closed cellular structure with a relatively thick cellular wall. The foamed cells were uniform and had a diameter of not more than 0.4 mm. The expansion ratio (volume ratio) was 10.5.

The foamed sheet is suitable for use as a food packing container such as a tray molded by vacuum forming or pressure forming.

EXAMPLE 5

|  | Amount (g) |
|---|---|
| Resin: | |
| Ethylene-vinyl acetate copolymer (YuKaLon-EVA 20F manufactured by Mitsubishi Petrochemical Co., Ltd.; MI = 2, density = 0.93 | 10,000 |
| Fine Powders: | |
| Precipitated calcium carbonate (Whiton SB manufactured by Shiraishi Calcium Co., Ltd.; average particle diameter 1.8 microns) | 2,000 |
| Pulp powder (KC Flock manufactured by Sanyo Kokusaku Pulp Co., Ltd.; W200; particle diameter 200 M/S pass) | 500 |
| Surface activators: | |
| Fatty acid alkanol amide (Amisol CDE manufactured by Kawaken Fine Chemicals, Co., Ltd.) | 150 |
| Fatty acid monoglyceride (Rikemal S-100 manufactured by Riken Vitamin Co., Ltd.) | 50 |
| Calcium stearate (manufactured by Toa Rika Co., Ltd.) | 100 |
| Coloring agent: | |
| titanium oxide (anatase type, A100 manufactured by Ishihara Sangyo Co., Ltd.) | 500 |
| Antioxidants: | |
| pentaerythritol tetrakis (beta-lauryl thiopropionate) | 20 |

-continued

| | Amount (g) |
|---|---|
| Hindered phenol-type antioxidant | 10 |

The above ingredients except the resin were put into the same high-speed mixer as used in Example 1, and the mixer was rotated at a high speed. Eight minutes later, the resin was introduced. After the lapse of 20 minutes from the start of the operation, the current of the mixing motor fluctuated violently and began to increase slightly (the temperature of the mixture 185° C.). After the lapse of 160 seconds, the current rapidly increased and reached 50 A in 20 to 25 seconds (180 to 185 seconds in total). The discharge port was therefore opened, and the mixture was released.

The released mixture was rapidly cooled and coarsely pulverized by a mixer rotating at a low speed by sending strong air for cooling, and there was obtained a resin compound having a water vapor adsorption ratio of 0.58% and composed of porous agglomerated particles resulting from partial melt-adhesion of the resin particles covered with he fine powder.

The resin compound was pulverized to a maximum particle diameter of not more than 5 mm by a pulverizer (Model Tc-3, 3HP manufactured by Morita Seisakusho), and then transferred to a mixer rotating at 50 to 300 rpm. As an aqueous medium, 675 cc (about 3 parts by weight per 100 parts by weight of the resin compound) of tap water containing 2% of polyvinyl alcohol (manufactured by Kuraray Inc.) dissolved therein by heating was added and mixed for 5 minutes to give a resin compound impregnated with the aqueous medium.

A T-die was secured to a 50 mm extruder, and an air knife was provided on both surfaces of the die lip portion for cooling the tip of the die lip and the extruded sheet. By using this device, the resin compound impregnated with the aqueous medium was foamed and extruded while maintaining the maximum temperature of the extruder cylinder at 200° C., the die temperature at 170° (the resin temperature at 170° C.) and the die lip temperature at 165° C. The extruded sheet was stretched and taken up while being rapidly cooled by the air knives.

The resin foam was a corrugated foamed sheet having a closed cellular structure with directionality as a result of stretching. The foamed cells had a diameter of not more than 0.7 mm, and mostly about 0.5 and were uniform. The expansion ratio (volume ratio) was 12.5.

The foamed sheet is flexible and elastic and suitable as a cushioning material.

EXAMPLE 6

The resin compound obtained in Example 1 was extruded by an extrusion sheet line comprising a 70 mm extruder with a vent, a coat hanger die secured thereto, and an air knife, a polishing roll and a take-up device provided in the die lip portion while maintaining the maximum temperature of the extruder at 240° C. and the die temperature at 220° C.

The highly filled sheet obtained was vacuum-formed or pressure-formed to form a tray for packing foods. The molded product had rigidity during use which was 15 to 30% higher than a high-impact polystyrene sheet of the same thickness obtained by using the same die. Moldability was much the same for both of these sheets.

What is claimed is:

1. A process for producing a resin foam by using an aqueous medium, which comprises
   (a) treating a resin compound with said aqueous medium to cause the aqueous medium to adhere to and be held by the resin compound, said resin compound being composed of porous agglomerated particles resulting from partial melt-adhesion of thermoplastic resin particles coated with a fine hydrophilic solid powder which does not substantially melt at the melting temperature of the resin particles, said solid powder being embedded in the resin particles but partly exposed at their surfaces,
   (b) melt-kneading the resin compound treated with the aqueous medium under such an elevated pressure that evaporation of the aqueous medium is substantially inhibited, and
   (c) thereafter releasing the kneaded resin composition from the pressurized state to foam it.

2. The process of claim 1 wherein the thermoplastic resin particles are composed of at least one resin selected from the group consisting of olefinic resin, diene resins, vinyl resins, acrylic resins, styrene resins, polyamide resins, and polyester resins.

3. The process of claim 2 wherein the thermoplastic resin particles are composed of an olefinic resin or a styrene resin.

4. The process of claim 1 wherein the fine hydrophilic solid powder has a solubility in water of not more than 10 g/liter at 25° C.

5. The process of claim 1 wherein the fine hydrophilic solid powder has an average particle diameter of not more than 100 microns.

6. The process of claim 1 wherein the fine hydrophilic solid powder is selected from the group consisting of a powder of a plant, a powder of a resin, a powder of a metal and a powder of an inorganic material.

7. The process of claim 1 wherein the fine hydrophilic solid powder is selected from the group consisting of talc, calcium carbonate, clay, silica and alumina.

8. The process of claim 7 wherein the fine hydrophilic solid powder has an average particle diameter of 1 to 15 microns.

9. The process of claim 1 wherein the fine hydrophilic solid powder is surface-treated with a surface-active agent.

10. The process of claim 1 wherein the fine hydrophilic solid powder contains up to 20% by weight, based on its total weight, of organic or inorganic short fibers.

11. The process of claim 1 wherein the porous agglomerated particles have a water vapor adsorption ratio of at least 0.05%.

12. The process of claim 1 wherein the porous agglomerated particles consist of 100 parts by weight of the thermoplastic resin particles and 30 to 250 parts by weight of the fine hydrophilic solid powder.

13. The process of claim 12 wherein the proportion of the fine hydrophilic solid powder is 60 to 150 parts by weight.

14. The process of claim 1 wherein the aqueous medium is water or a mixture of water with at least one material selected from the group consisting of surface-active agents, water-soluble polymers, polyhydric alcohols and water-miscible organic solvents.

15. The process of claim 1 wherein the aqueous medium is water.

16. The process of claim 1 wherein 1 to 15 parts by weight of the aqueous medium is adhered per 100 parts by weight of the porous agglomerated particles.

17. The process of claim 1 wherein the proportion of the aqueous medium is 1.5 to 10 parts by weight.

18. The process of claim 1 wherein the melt-kneading is carried out in a nonvent-type extruder.

19. The process of claim 1 wherein the melt-kneaded resin composition is extruded from a die lip or injected into a mold.

20. A thermoplastic resin compound having a water vapor adsorption ratio of at least 0.05% and being composed of porous agglomerated particles resulting from partial melt-adhesion of thermoplastic resin particles coated with a fine hydrophilic solid powder which does not substantially melt at the melting temperature of the resin particles, said solid powder being embedded in the resin particles but partly exposed at their surfaces.

21. The resin compound of claim 20 wherein the thermoplastic resin particles are composed of at least one resin selected from the group consisting of olefinic resins, diene resins, vinyl resins, acrylic resins, styrene resins, polyamide resins, and polyester resins.

22. The resin compound of claim 20 wherein the thermoplastic resin particles are composed of an olefinic resin or a styrene resin.

23. The resin compound of claim 20 wherein the fine hydrophilic solid powder has a solubility in water of not more than 10 g/liter, preferably not more than 5 g/liter, at 25° C.

24. The resin compound of claim 20 wherein the fine hydrophilic solid powder has an average particle diameter of not more than 100 microns.

25. The resin compound of claim 20 wherein the fine hydrophilic solid powder is selected from the group consisting of a powder of a plant, a powder of a resin, a powder of a metal and a powder of an inorganic material.

26. The resin compound of claim 20 wherein the fine hydrophilic solid powder is selected from the group consisting of talc, calcium carbonate, clay, silica and alumina.

27. The resin compound of claim 20 wherein the fine hydrophilic solid powder has an average particle diameter of 1 to 15 microns.

28. The resin compound of claim 20 wherein the fine hydrophilic solid powder is surface-treated with a surface-active agent.

29. The resin compound of claim 20 wherein the fine hydrophilic solid powder contains up to 20% by weight, based on its total weight, of organic or inorganic short fibers.

30. The resin compound of claim 20 wherein the porous agglomerated particles have a water vapor adsorption ratio of at least 0.3%.

31. The resin compound of claim 20 wherein the porous agglomerated particles consist of 100 parts by weight of the thermoplastic resin particles and 30 to 250 parts by weight of the fine hydrophilic solid powder.

32. The resin compound of claim 31 wherein the proportion of the fine hydrophilic solid powder is 60 to 150 parts by weight.

33. A process for producing the thermoplastic resin compound of claim 20, which comprises mixing thermoplastic resin particles and a fine hydrophilic solid powder which does not substantially melt at the melting temperature of the resin, in a high-speed rotating mixer at a high speed and a temperature above the melting temperature of the resin, and immediately cooling and solidifying the mixture when porous agglomerated particles result from partial melt-adhesion of the thermoplastic resin particles coated with the fine hydrophilic solid powder.

* * * * *